United States Patent
Howard et al.

(10) Patent No.: US 11,595,456 B2
(45) Date of Patent: Feb. 28, 2023

(54) MODIFYING CONTENT STREAMING BASED ON DEVICE PARAMETERS

(71) Applicant: Microsoft Technology Licensing, LLC, Redmond, WA (US)

(72) Inventors: Matthew Charles Howard, Bothell, WA (US); Glenn Frederick Evans, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 28 days.

(21) Appl. No.: 15/994,783

(22) Filed: May 31, 2018

(65) Prior Publication Data

US 2019/0373036 A1    Dec. 5, 2019

(51) Int. Cl.
| | |
|---|---|
| *H04L 65/756* | (2022.01) |
| *H04L 65/613* | (2022.01) |
| *H04L 65/80* | (2022.01) |
| *H04L 65/612* | (2022.01) |
| *H04L 65/75* | (2022.01) |
| *H04N 21/2343* | (2011.01) |

(52) U.S. Cl.
CPC .......... *H04L 65/613* (2022.05); *H04L 65/612* (2022.05); *H04L 65/762* (2022.05); *H04L 65/80* (2013.01); *H04N 21/2343* (2013.01)

(58) Field of Classification Search
CPC ............. H04L 12/1859; H04L 43/0888; H04L 65/604; H04L 65/4084; H04L 41/22; H04L 65/602; H04L 65/4092; H04L 67/303; H04L 67/06; H04L 1/1835; H04L 65/606; H04L 43/0894; H04L 65/4069; H04W 4/18; H04W 8/24; H04W 24/04; H04W 52/267; H04W 48/18; H04W 72/087; H04N 19/102; H04N 21/24; H04N 21/23424; G06F 15/16; G06F 1/3212; G06F 9/46; G06F 1/329; H01Q 3/26

See application file for complete search history.

(56) References Cited

U.S. PATENT DOCUMENTS

| | | | |
|---|---|---|---|
| 7,529,806 B1 | 5/2009 | Shteyn | |
| 7,797,441 B1* | 9/2010 | Barnes | G06F 15/16 709/231 |
| 8,218,439 B2* | 7/2012 | Deshpande | H04L 65/608 370/235 |
| 8,250,228 B1* | 8/2012 | Johansson | G06F 9/46 709/231 |
| 9,047,236 B2* | 6/2015 | Gigliotti | H04L 65/604 |
| 9,106,887 B1* | 8/2015 | Owen | H04L 41/22 |
| 9,326,012 B1* | 4/2016 | Dorwin | H04N 21/24 |
| 9,363,691 B1* | 6/2016 | Shipley | H04W 24/04 |
| 9,521,178 B1* | 12/2016 | Gigliotti | H04L 43/0894 |
| 2002/0120747 A1* | 8/2002 | Frerichs | H04L 65/604 709/227 |

(Continued)

*Primary Examiner* — Dustin Nguyen
(74) *Attorney, Agent, or Firm* — ArentFox Schiff LLP

(57) ABSTRACT

Described are examples for streaming content at a device. One or more environmental parameters can be determined for the device. One or more parameters for receiving streaming content via one or more streaming servers over one or more network connections can be modified based on the one or more environmental parameters. The streaming content can be received based at least in part on the one or more streaming parameters.

20 Claims, 5 Drawing Sheets

(56) References Cited

U.S. PATENT DOCUMENTS

| | | | |
|---|---|---|---|
| 2006/0092281 A1* | 5/2006 | Herley | H04N 21/23424 348/207.99 |
| 2007/0135082 A1* | 6/2007 | Erhart | H04W 8/24 455/343.5 |
| 2007/0224951 A1* | 9/2007 | Gilb | H01Q 3/26 455/127.5 |
| 2008/0049660 A1* | 2/2008 | Kwan | H04W 52/267 370/318 |
| 2009/0282275 A1* | 11/2009 | Yermalayeu | G06F 1/329 713/320 |
| 2010/0185730 A1* | 7/2010 | Sebastian | H04L 12/1859 709/204 |
| 2011/0066673 A1* | 3/2011 | Outlaw | H04L 65/4092 709/203 |
| 2011/0093605 A1* | 4/2011 | Choudhury | H04L 67/303 709/231 |
| 2012/0086815 A1* | 4/2012 | Cooper | H04L 65/602 348/207.1 |
| 2012/0210150 A1* | 8/2012 | de Lind van Wijngaarden | G06F 1/3212 713/320 |
| 2013/0227106 A1* | 8/2013 | Grinshpun | H04W 4/18 709/223 |
| 2013/0346590 A1* | 12/2013 | Scurtu | H04L 65/602 709/224 |
| 2014/0113628 A1* | 4/2014 | Sundararajan | H04W 48/18 455/435.2 |
| 2014/0156863 A1* | 6/2014 | Gao | H04L 65/4084 709/231 |
| 2014/0250168 A1* | 9/2014 | Damola | H04L 67/06 709/203 |
| 2015/0256577 A1* | 9/2015 | Gutierrez Vilaro | H04L 65/4084 709/203 |
| 2015/0271232 A1* | 9/2015 | Luby | H04L 65/4084 709/231 |
| 2015/0281299 A1* | 10/2015 | Moustafa | H04L 65/4084 709/219 |
| 2016/0192296 A1* | 6/2016 | Rehan | H04L 65/604 455/574 |
| 2016/0212054 A1* | 7/2016 | Howard | H04L 65/4069 |
| 2017/0163709 A1* | 6/2017 | Owen | H04N 19/102 |
| 2017/0195393 A1* | 7/2017 | Su | H04L 43/0888 |
| 2018/0255117 A1* | 9/2018 | Ljung | H04L 1/1835 |
| 2021/0076250 A1* | 3/2021 | Wang | H04W 72/087 |

* cited by examiner

MODIFYING CONTENT STREAMING BASED ON DEVICE PARAMETERS

BACKGROUND

Content streaming has evolved to allow for streaming of high quality, sizeable, digital content to various types of devices. This has been facilitated by higher available network bandwidths on the devices through one or various connections, higher and more efficient processing being performed by the devices, and the like. Content streaming involves adaptively fetching segments of media content at different quality levels (usually 2 to 4 second segments) from different network servers and seamlessly playing them back. One goal of content streaming is to provide smooth streaming by quickly starting smooth playback then to ramp up the resolution so that picture appears sharper. The fetching algorithm can be complex due to the possibility of networks failures (possibly for 30 second to a minute), slow or congested networks, out-of-order processing of network requests, memory constraints of the streaming device, and limitations imposed by content protection requirements (e.g. the content provider may not allow for downloading more than 5 minutes of content at a time). As network bandwidth becomes more readily available, challenges associated with timely delivering content to devices become less of an issue.

Devices streaming content today can include personal devices that can be at least partially powered by battery. Streaming content to such devices can potentially require a large amount of power not only to process and display the content, but also to request and receive the content over the one or more network connections to one or more streaming servers. For example, WiFi devices can run for a short time at a higher active power then use long timeouts to go into low power states. In addition, solid state drives can take time to power down and frequent writes can keep them active. Moreover, frequent waking of a processor can prevent lower power states. The resulting need for constant power can result in large demands on the battery, and undesirable device power status, which may lower desirability of consuming such content on personal devices.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, a computer implemented method for streaming content to a device is provided. The method includes determining a power source used to power the device, determining an achievable network bandwidth by the device over one or more network connections to one or more streaming servers, determining an amount of buffered streaming content at the device, modifying, based at least in part on the power source, the achievable network bandwidth, and the amount of buffered streaming content, one or more parameters for receiving streaming content via the one or more streaming servers over the one or more network connections, and receiving, based at least in part on the one or more parameters, the streaming content.

In another example, a device configured for streaming content is provided. The device includes a memory storing one or more parameters or instructions for executing a streaming application, and at least one processor coupled with the memory. The at least one processor is configured to determine a power source used to power the device, determine an achievable network bandwidth by the device over one or more network connections to one or more streaming servers, determine an amount of buffered streaming content at the device, modify, based at least in part on the power source, the achievable network bandwidth, and the amount of buffered streaming content, one or more parameters for receiving, by the streaming application, streaming content via the one or more streaming servers over the one or more network connections, and receive, based at least in part on the one or more parameters, the streaming content.

In another example, a computer-readable medium, including code executable by one or more processors for streaming content to a device is provided. The code includes code for determining a power source used to power the device, determining an achievable network bandwidth by the device over one or more network connections to one or more streaming servers, determining an amount of buffered streaming content at the device, modifying, based at least in part on the power source, the achievable network bandwidth, and the amount of buffered streaming content, one or more parameters for receiving streaming content via the one or more streaming servers over the one or more network connections, and receiving, based at least in part on the one or more parameters, the streaming content.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
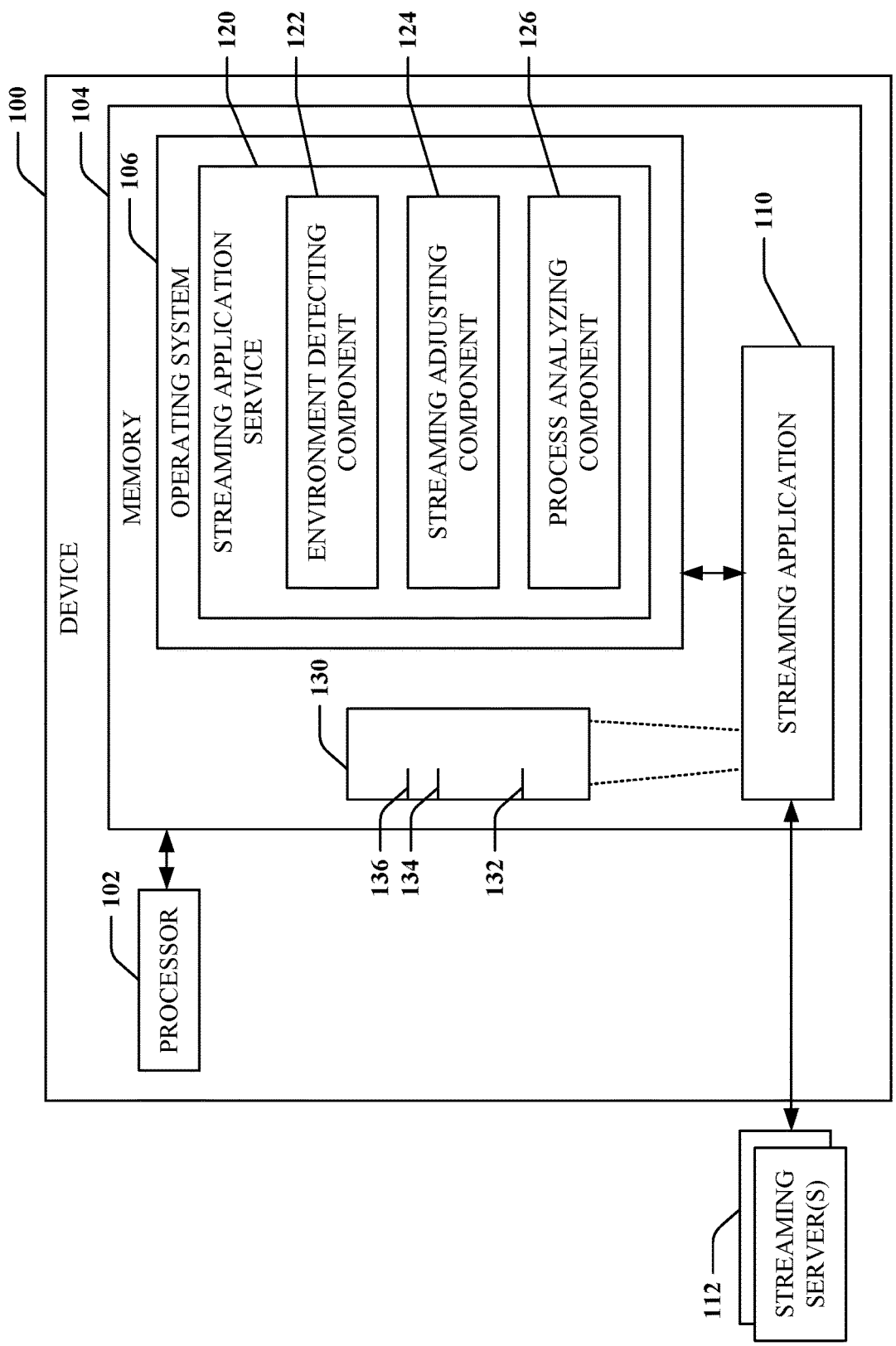
FIG. 1 is a schematic diagram of an example of a device for streaming content from one or more streaming servers.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to streaming content on devices where one or more streaming parameters can be adjusted on a device based on one or more environmental parameters associated with the device. For example, the device may be powered at least partially by a battery, which may give way to power considerations of streaming content to the device. Many aspects of consuming streaming content may impact power used by the device, including power required to process the streaming content, power required to display the streaming content, power required to request and receive the streaming content (e.g., power associated with network device(s) used by the device to request and receive the streaming content), and/or the like. Power savings in stream content can be achieved by adjusting one or more streaming parameters to modify a streaming process based on one or more environmental parameters of the device.

For example, the streaming parameters can be modified to impact an amount of network data read in a block, a length of idle periods between buffering periods, that there is some delay while reading streaming content, that the network and/or application layers of the device do not incur inefficient code paths when fetching data, that disc activity can be avoided or eliminated so a disc (e.g., a solid state drive (SSD)) of the device can power down, that auxiliary network can be avoided or eliminated when streaming content, that background processor, network, disc activity caused by the operating system and/or other applications can be reduced or eliminated. In an example, the one or more environmental parameters can correspondingly be analyzed to detect the above conditions and modify the associated streaming parameters.

For example, the one or more environmental parameters may correspond to whether the device is powered by battery or by a more persistent power source (e.g., utility grid power), a capacity and/or remaining capacity of the battery used to power the device, an achievable network bandwidth that can be achieved by the device based on using one or various network connections to communicate with one or various content servers, an amount of streaming content buffered on the device, and/or the like. Based on one or more of these parameters, and associated values, the device may adjust one or more streaming parameters, such as an amount of streaming content to request in a single requests, a list of servers from which to request the streaming content, a number of streaming requests to transmit at a given time, whether to utilize overlapping streaming requests, a minimum amount of the buffered streaming content to store in a buffer before requesting additional streaming content, a maximum amount of the buffered streaming content to store in a buffer before pausing requesting of additional streaming content or reducing power to certain portions of the device, and/or the like. In another example, the device can detect a process executing on the device, and may pause or terminate the process during streaming of the content. In another example, the device may request streaming of content based on detecting that the process executing on the device is using the network device(s) of the device.

In the above examples, consideration of the device environment can impact the selection of streaming parameters on the device. In this regard, more intuitive decisions can be made regarding power consumption and reduction by the device when processing streaming content. This can result in more efficient power utilization by a streaming application, improve a user experience by increasing effective network bandwidth (which can allow for achieving higher bandwidth and/or lowering buffering time to start playback), etc.

Figure 2:
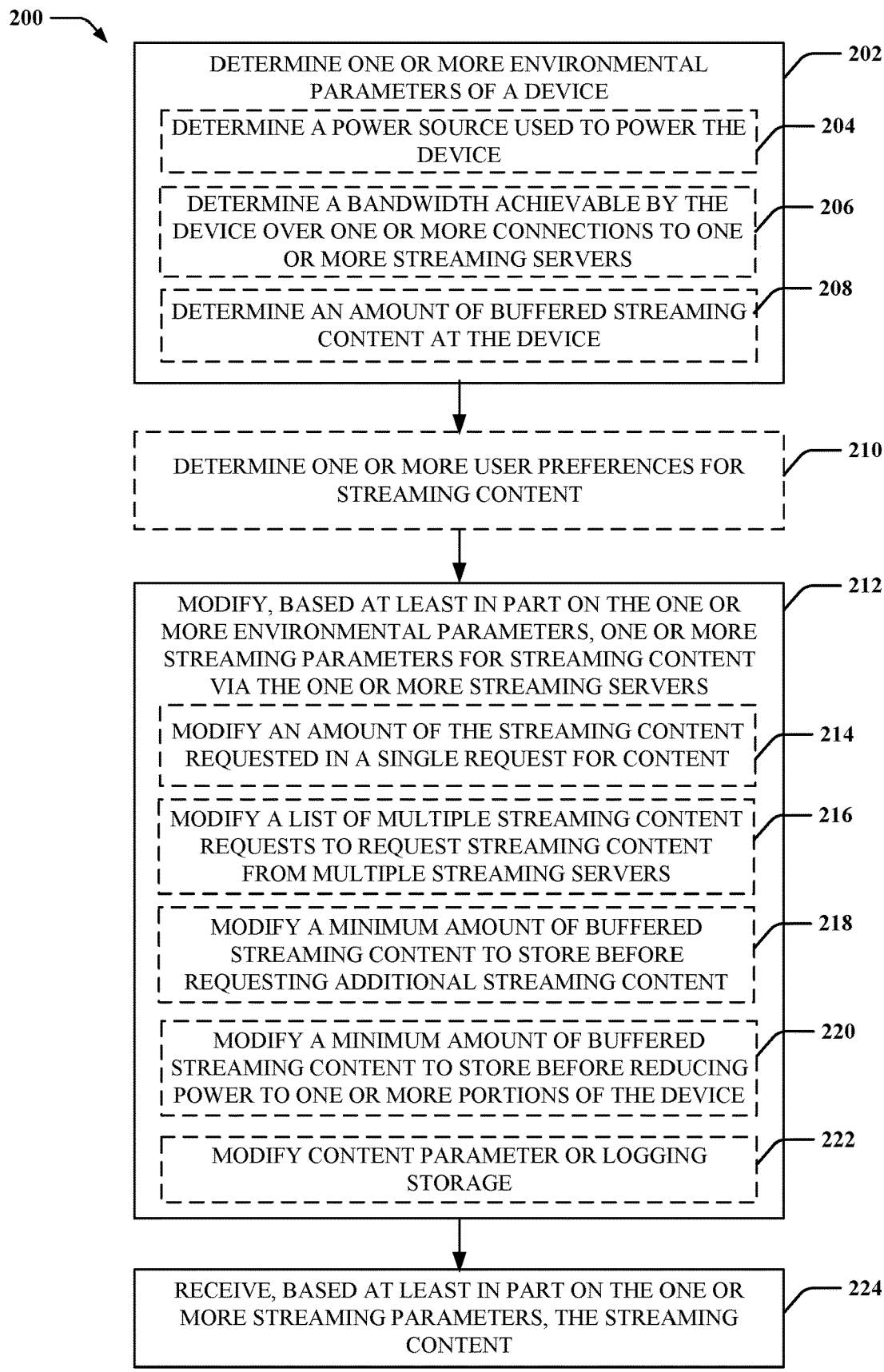
FIG. 2 is a flow diagram of an example of a method for adjusting streaming parameters based on detected environmental parameters.
Figure 3:
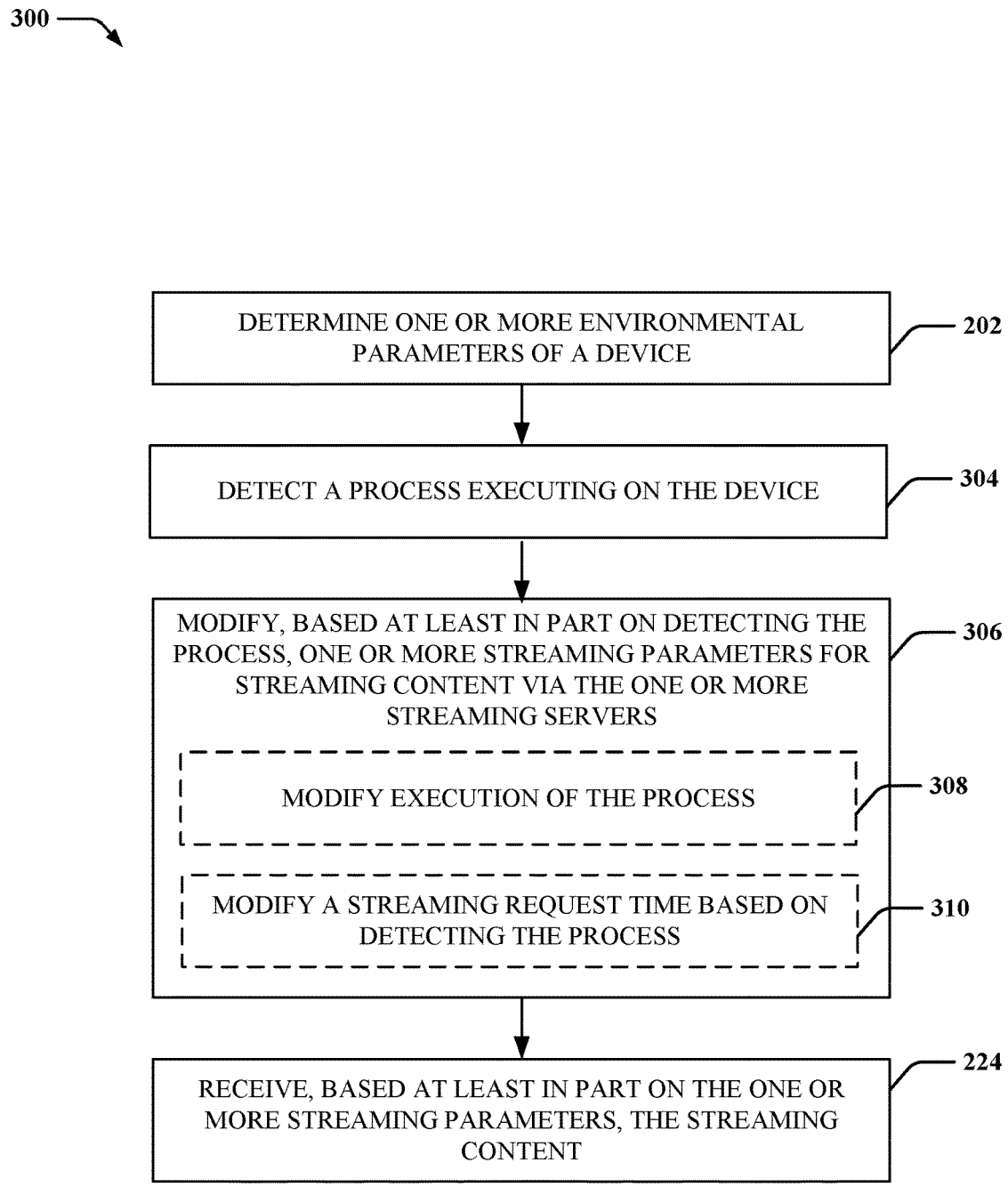
FIG. 3 is a flow diagram of an example of a method for adjusting streaming parameters based on one or more detected processes.

Turning now to FIGS. 1-5, examples are depicted with reference to one or more components and one or more methods that may perform the actions or operations described herein, where components and/or actions/operations in dashed line may be optional. Although the operations described below in FIGS. 2-3 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a device 100 (e.g., a computing device) that can stream content from one or multiple streaming servers 112. In an example, device 100 can include a processor 102 and/or memory 104 configured to execute or store instructions or other parameters related to providing an operating system 106, which can execute one or more applications or processes, such as a streaming application 110 for obtaining and rendering streaming content from one or more streaming servers 112, a streaming application service 120 for detecting environmental parameters of the device 100, modifying streaming parameters for receiving the streaming content, and/or the like. For example, processor 102 and memory 104 may be separate components communicatively coupled by a bus (e.g., on a motherboard or other portion of a computing device, on an integrated circuit, such as a system on a chip (SoC), etc.), components integrated within one another (e.g., processor 102 can include the memory 104 as an on-board component), and/or the like. Memory 104 may store instructions, parameters, data structures, etc. for use/execution by processor 102 to perform functions described herein.

In an example, operating system 106 can provide the streaming application service 120, which may include an environment detecting component 122 for detecting one or more environmental parameters related to the device 100 that may impact how streaming content is requested and/or processed, a streaming adjusting component 124 for adjusting one or more streaming parameters used by the streaming application 110 in requesting and/or processing streaming content, and/or a process analyzing component 126 for analyzing one or more processes executing on the device (e.g., aside from the streaming application 110 and/or streaming application service 120). For example, the one or more streaming parameters may be modified based at least in part on an amount of buffered streaming content data to improve the streaming experience. For example, memory 104 can include a streaming content buffer, which can be represented by buffer 130.

Streaming application 110 can utilize a "leaky bucket" type of algorithm to buffer streaming content. The leaky bucket algorithm may include a first-in first-out (FIFO) queue that is buffered to achieve a certain "water level," or threshold amount of utilized memory, and parameters of streaming the content to increase or decrease a rate of buffering can be modified based on the amount of utilized memory. Thus, buffer 130 can have one or more associated water levels 132, 134, 136, which are detectable by the streaming application service 120, such that streaming application service 120 can detect when the buffer 130 reaches one or more water levels 132, 134, 136 (e.g., corresponding to threshold memory utilization or capacity), and can accordingly modify one or more streaming parameters based on the detecting. For example, when data in the buffer is at a capacity lower than water level 132, streaming application service 120 may modify one or more parameters to increase a rate of buffering the streaming content and cause the buffer 130 to store more streaming content in the buffer 130 (e.g., at a rate faster than the streaming content is consumed by the device 100) to achieve a buffer utilization at or greater than the water level 132. Similarly, achieving (or not achieving) other water levels, such as water levels 134, 136 can be detected and utilized to set other streaming parameters (e.g., whether to pause streaming requests, terminate or reduce power to components of the device 100, etc.) to improve power consumption associated with streaming content.

FIG. 2 is a flowchart of an example of a method 200 for modifying parameters for streaming content based on detecting one or more environmental parameters associated with a device. For example, method 200 can be performed by a device 100 and/or one or more components thereof to facilitate streaming content.

In method 200, at action 202, one or more environmental parameters of a device can be determined. In an example, environment detecting component 122, e.g., in conjunction with processor 102, memory 104, operating system 106, streaming application service 120, etc., can determine the one or more environmental parameters of the device. For example, environment detecting component 122 can determine the one or more environmental parameters relating to powering the device 100, such as an amount of power used by one or more portions of the device, a type or source of power used by the one or more portions of the device, a power capacity of the device, etc. In another example, environment detecting component 122 can determine the one or more environmental parameters relating to network communications by the device 100, such as an achievable or supported bandwidth over one or more network connections (e.g., to one or more streaming servers 112), an achievable or supported communication rate over the one or more connections, a number of connections to the one or more streaming servers 112, a number of streaming servers, etc. In yet another example, environment detecting component 122 can determine the one or more environmental parameters relating to the streaming content, such as a buffer status of a buffer 130 storing the streaming content, a supported streaming rate for the content, etc. As described herein, one or more of these parameters (or similar environmental parameters) can be used to modify streaming parameters to improve power consumption during content streaming operations.

In one example, in determining the one or more environmental parameters at action 202, optionally at action 204, a power source used to power the device can be determined. In an example, environment detecting component 122, e.g., in conjunction with processor 102, memory 104, operating system 106, streaming application service 120, etc., can determine the power source used to power the device 100. For example, environment detecting component 122 can detect whether the device 100 is powered using battery or another power source (e.g., a more persistent power source, such as alternating current (AC) power), an extent to which the device 100 is powered by battery, a capacity of the battery, etc. For example, environment detecting component 122 may receive information regarding the power source from the operating system 106, which can monitor use of a power port of the device 100 used to supply the other power source to the device 100. In an example, environment detecting component 122 can query the operating system 106 for a type of power used to power the device 100, can receive notifications of a change in power source from the operating system 106, etc. In any case, environment detecting component 122 can be configured to obtain information regarding the power source used to power the device 100.

In one example, in determining the one or more environmental parameters at action 202, optionally at action 206, a bandwidth achievable by the device over one or more connections to one or more streaming servers can be determined. In an example, environment detecting component 122, e.g., in conjunction with processor 102, memory 104, operating system 106, streaming application service 120, etc., can determine the bandwidth achievable by the device 100 over the one or more connections to the one or more streaming servers. For example, environment detecting component 122 can determine the achievable bandwidth based on an indicator (e.g., from the streaming server) of the bandwidth achievable in communicating with the streaming server, an indication from an interne service provider of a supported bandwidth over a given connection, a history and/or statistical model of bandwidth achieved over a connection (e.g., a given connection with one or more streaming servers), and/or the like. In one example, the achievable bandwidth may be derived from an achievable or achieved data rate over the connection, a time-of-day (e.g., where different rates are experienced at different times-of-day), a status of a network interface of the device 100, and/or the like.

In another example, in determining the one or more environmental parameters at action 202, optionally at action 208, an amount of buffered streaming content at the device can be determined. In an example, environment detecting component 122, e.g., in conjunction with processor 102, memory 104, operating system 106, streaming application service 120, etc., can determine the amount of buffered streaming content at the device 100. As described, for example, the device 100 can request and receive streaming content, which device 100 can store in a buffer 130 for consumption. When data is consumed from the buffer 130, it can be consumed in FIFO order to provide a leaky bucket effect where data is being consumed and buffered during similar periods of time such that the level of utilization of the buffer 130 may rise or fall or remain substantially consistent over a period of time depending on the rate data is consumed and the rate data is buffered. In any case, environment detecting component 122 may detect the amount of buffered streaming content (e.g., the level of buffer utilization) at a given point in time, and/or may determine how the amount compared to the one or more water levels 132, 134, 136.

In method 200, at action 210, one or more user preferences for streaming content can be determined. In an example, streaming adjusting component 124, e.g., in conjunction with processor 102, memory 104, operating system 106, streaming application service 120, etc., can determine the one or more user preferences for streaming content. For example, the one or more user preferences may relate to streaming the content and/or may define a policy for determining the one or more streaming parameters. For example, the user preferences may be indicated via the streaming application 110, and may specify preferences at various possible granularities. For example, the user preferences may specify a generally desired video quality, a desired video quality in certain situations (e.g., saving power or maximizing robustness to network outages or waiting for content to buffer to always show a minimum resolution), or a desired video quality for one or more given values of a given power source, achievable bandwidth, amount of buffered streaming content, etc.

In method 200, at action 212, one or more streaming parameters for streaming content via the one or more streaming server can be modified based at least in part on the one or more environmental parameters. In an example, streaming adjusting component 124, e.g., in conjunction with processor 102, memory 104, operating system 106, streaming application service 120, etc., can modify, based at least in part on the one or more environmental parameters, one or more streaming parameters for streaming content (e.g., or controlling reception of streaming content) via the one or more streaming servers. For example, the one or more streaming parameters may relate to performing streaming via a streaming application 114 to obtain streaming content from one or more streaming servers, and may be adjusted to provide a desirable streaming experience and/or power consumption by the streaming application 114 based at least in part on the one or more environmental parameters. In addition, streaming adjusting component 124 can modify the streaming parameters based on whether the streaming is a live feed or an on-demand feed. For example, a live feed may not consider the environmental parameters, or may have lowered or different thresholds for the environmental parameters for modifying the streaming parameters. Moreover, for example, streaming adjusting component 124 can modify the streaming parameters further based on the one or more user preferences and/or a policy defined by the one or more user preferences (e.g., when considering the one or more environmental parameters or otherwise).

In one example, in modifying the one or more streaming parameters at action 212, optionally at action 214, an amount of the streaming content requested in a single request for content can be modified. In an example, streaming adjusting component 124, e.g., in conjunction with processor 102, memory 104, operating system 106, streaming application service 120, etc., can modify the amount of the streaming content requested in the single request for content. In an example, this can include requesting more content in the request by specifying a higher amount of content requested (e.g., indicating a window or duration of content requested), or this can include batching multiple requests for content into a single request, or sending multiple requests in series, as described above, without necessarily waiting for replies. The selected mechanism may be based on the functionality allowed by the streaming server(s) 112 from which the content is requested (e.g., whether to request a larger content size or to batch multiple requests).

For example, to increase the amount of useful content data sent when the device is at a higher power state (e.g., when a network interface, such as a WiFi card or adaptor, is operating at a full or high power state), streaming adjusting component 124 can modify streaming requests to read more segments of streaming data at a time. For example, a segment can refer to a portion of streaming content having a fixed duration (e.g., a number of seconds). This can allow the application to read more data once the device (e.g., via the network interface) has switched to higher network speeds, which can reduce overall timeout periods. For example, configuring the device 100 to read two segments at a time from one or more streaming servers 112 (as opposed to one segment at a time), can reduce the number of timeouts by one half. It is possible that this may result in perceptible degradation in quality of the streaming content at start-up or when seeking within the content (e.g., during times where the buffer 130 is empty or at a lower level, such as less than water level 132). Thus, in one example, streaming application service 120 may modify this parameter when the environment detecting component 122 detects that the buffer 130 is at a certain threshold level (e.g., after start-up when the streaming application 110 and/or corresponding buffer 130 is in a substantially steady state of having some buffered streaming content to render). In another example, streaming application service 120 may modify this parameter when the environment detecting component 122 detects that an amount of data requested in each request is related to an amount of data already buffered in the buffer 130.

In one example, in modifying the one or more streaming parameters at action 212, optionally at action 216, a list of multiple streaming content requests can be modified to request streaming content from multiple streaming servers. In an example, streaming adjusting component 124, e.g., in conjunction with processor 102, memory 104, operating system 106, streaming application service 120, etc., can modify the list of multiple streaming content requests to request streaming content from multiple streaming servers. For example, streaming adjusting component 124 can configure the multiple streaming content requests to overlap one another to facilitate the multiple streaming content requests. Using overlapping requests, in this regard, can mitigate or decrease dead time delays caused during data reads based on the request/response delay of the streaming servers 112. This can allow for improving power efficiency, increasing usable network bandwidth, and saturating the network stack of the device 100.

For example, each request can correspond to a segment, such that requests for segments can be overlapped. The streaming application 110 can receive a manifest of segments to fetch to obtain the streaming content. In this example, the streaming adjusting component 124 can modify universal resource indicators (URIs) in the manifest to receive segments from different streaming servers 112, overlap requests for the segments, etc. In addition, in this regard, streaming application 110 can include logic for reordering segments that may be received out-of-order from the multiple streaming servers 112, handling requesting or dropping of missing or delinquently received segments, etc.

In one example, streaming application service 120 can determine whether overlapping requests are supported. For example, this can include streaming application service 120 querying the one or more streaming servers 112 for an indication that overlapping requests are (or are not) supported. In another example, this can include streaming application service 120 indicating, to one or more of the streaming servers 112, an ability to support the overlapping requests (which may be in response to the query or otherwise). For example, the one or more streaming servers 112 may otherwise close connections when multiple requests are received, and thus providing this functionality of indicating support for overlapping requests by the streaming application service 120 and/or allowing the one or more streaming servers 112 to indicate such support to the streaming application service 120 may enable avoiding closing of the connections when multiple overlapping requests are received. Moreover, fetching more content can slow adaptive resolution algorithms, and thus streaming adjusting component 124 may adjust this parameter further based on the one or more environmental parameters (e.g., when the buffer 130 achieves or is at a certain level).

In one example, in modifying the one or more streaming parameters at action 212, optionally at action 218, a minimum amount of buffered streaming content to store before requesting additional streaming content can be modified. In an example, streaming adjusting component 124, e.g., in conjunction with processor 102, memory 104, operating system 106, streaming application service 120, etc., can modify the minimum amount of buffered streaming content to store before requesting additional streaming content. For example, in addition (or alternatively) to increasing the number of segments read in each request, streaming adjusting component 124 may increase the total duration of data the streaming application 110 reads before draining its buffer 130. One difference between reading single segments end to end and groups of segments is that data bandwidth estimates, positions, etc. can be updated on each segment. For example, the streaming adjusting component 124 can adjust the parameter so the streaming application 110 reads (and stores in buffer 130) one minute of streaming content, then lets the buffer 130 drain, if it is full or at an associated water level, and repeats. This can include reading a single one minute segment from each of independent video and audio streams. This duration parameter for the batch can be determined at least in part by content restrictions set by the streaming server(s) 112 regarding how much content can be buffered, and/or robustness considerations (e.g., longest buffering duration less the amount of time allowed for network failures). In one example, streaming adjusting component 124 can further adjust the minimum amount of buffered streaming content to store and/or the duration parameter for the batch based on an amount of memory available on the device 100 and/or an amount of memory allocated to, or allocable by, the streaming application service 120.

In one example, the parameter may correspond to one of the water levels, such as water level 134, where once the buffer 130 reaches water level 134, the streaming application 110 can refrain from requesting additional content. In an example, streaming adjusting component 124 can set this water level 134 based on the one or more environmental considerations, as described. For example, streaming adjusting component 124 can increase the water level 134 when environment detecting component 122 detects that the device 100 is powered using battery, as increasing the water level 134 may allow for less overhead in powering a network device of the device 100, requesting streaming content, powering down the network device in sleep mode, etc., and may allow for longer sleep durations for the network device. In other examples, however, where the environment detecting component 122 determines that less than a threshold bandwidth can be achieved over the one or more connections to the one or more streaming servers 112 or that the connection has a threshold volatility in achievable rate, for example, streaming adjusting component 124 can increase the water level 134 to facilitate buffering 130 more streaming content.

In one example, in modifying the one or more streaming parameters at action 212, optionally at action 220, a minimum amount of buffered streaming content to store before reducing power to one or more portions of the device can be modified. In an example, streaming adjusting component 124, e.g., in conjunction with processor 102, memory 104, operating system 106, streaming application service 120, etc., can modify the minimum amount of buffered streaming content to store before reducing power to one or more portions of the device. For example, streaming adjusting component 124 can modify the amount of streaming content to buffer before powering down a network device portion of the device 100. In one example, this parameter can correspond to water level 136, where the network device can sleep for a period of time once the water level 136 is achieved. For example, when environment detecting component 122 determines that the device 100 is powered by battery, the streaming adjusting component 124 can increase the water level 136 to obtain additional content before reducing or removing power to the network device, which can allow for avoiding overhead of powering on the network device, setting up the network connection to the streaming server(s) 112, requesting the content, etc., and can allow for longer sleep durations for the network device, which may result in a power savings.

In one example, in modifying the one or more streaming parameters at action 212, optionally at action 222, content parameter or logging storage can be modified. In an example, streaming adjusting component 124, e.g., in conjunction with processor 102, memory 104, operating system 106, streaming application service 120, etc., can modify content parameter or logging storage. For example, streaming adjusting component 124 can modify storage locations for the content parameters and/or logging to store in persistent (e.g., SSD or other harddrive, cloud storage, etc.) or non-persistent memory (e.g., random access memory), where memory 104 may include persistent and non-persistent storage. For example, where environment detecting component 122 determines that the device 100 is powered by battery, streaming adjusting component 124 may modify the streaming application 110 to store various content parameters and/or logging information in non-persistent storage to lessen the number and/or frequency of writing to persistent storage (e.g., a SSD or other harddrive, cloud storage, etc.), which may require more power than writing to non-persistent storage. In this example, the streaming application 110 may then periodically write the content parameters and/or logging information to the persistent storage to flush the information in the non-persistent storage.

In one example, streaming adjusting component 124 can adjust the parameter to cause streaming application 110 to write the content parameters and/or logging information to the persistent storage when the streaming application 110 is in a state where it can use the persistent storage for another purpose. For example, environment detecting component 122 may detect when this state occurs based on detecting a power state of the persistent storage, based on detecting a state of the streaming application 110 and/or a state of the buffer 130 (e.g., when the buffer 130 achieves or falls below a water level 132, 134, 136). In another example, as described further herein, streaming adjusting component 124 can adjust the parameter to cause streaming application 110 to write the content parameters and/or logging information to the persistent storage when environment detecting component 122 determines that the persistent storage (e.g., SSD or other hard drive, could storage, etc.) is active (e.g., based on being powered up by another process) to conserve power used in writing the information to the persistent storage.

In a specific example, where the power source of the device is detected to be battery, the achievable network bandwidth over a single connection achieves a bandwidth threshold, and the amount of buffered streaming content achieves a buffer threshold (e.g., a threshold water level) so that the device has a sufficient amount of content to playback for a period of time, this may indicate that the device 100 is in a desirable content delivery state, and thus when using battery power, streaming parameters can be adjusted in an attempt to conserve power without compromising the streaming experience. For instance, with this set of example environmental parameters where a concern relates to using battery power, stream adjusting component 124 can modify the parameters for streaming content, such as modifying streaming requests to cause the device to make overlapping requests for streaming content or increasing a size of requested content from the one (or multiple) streaming server(s) 112 to try to fill up to a high buffer threshold as fast as possible and reduce resource usage and save power (and since bandwidth is not constrained), and/or such as increasing a maximum buffer threshold to increase a time to sleep before hitting a minimum buffer threshold and triggering more requests, and/or such as reducing the minimum amount of buffered content to store before requesting additional content to save power by extending a time when the device sleeps before requesting more content, etc. Further to this example, when one of the environmental parameters changes (e.g., the power source changes to AC power, the achievable bandwidth falls below the bandwidth threshold, and/or the amount of buffered streaming content falls below the buffer threshold), streaming adjusting component 124 can adjust the parameters back to prioritize reliably receiving streaming content in time for playback over conserving power consumption. In other cases, when both power and throughput are constrained (e.g., when the power source is battery and/or when the achievable network bandwidth does not achieve a threshold), then stream adjusting component 124 can modify the parameters for streaming content to only make a single request for content at a time to avoid receiving multiple responses at a time that may potentially be out of order and that may cause a wait for receiving an earlier content item. In other words, based on a given set of environmental parameters, stream adjusting component 124 can modify the parameters for streaming content to conserve power while ensuring that sufficient content will be buffered and available for playback to the user.

In another example, the one or more environmental parameters can be detected and/or received (e.g., based on transmission by the device 100) by one or more streaming server(s) 112. In this example, the streaming server(s) 112 can adjust an amount or quality of content provided to the device 100, an amount of content provided to the device 100 in response to one of multiple content requests, a set of streaming servers 112 from which to provide the content to the device 100, buffering parameters to be used by the device 100 in buffering streaming content (e.g., an amount to be buffered, one or more water levels, etc.), where adjusting these parameters may be based on the detected or received environmental parameters of the device 100. For example, the streaming server(s) 112 can receive a power source or amount of buffered streaming content from the device 100 and/or can detect the achievable network bandwidth based on its connection with the device 100.

In method 200, at action 224, the streaming content can be received based at least in part on the one or more streaming parameters. In an example, streaming application 110, e.g., in conjunction with processor 102, memory 104, operating system 106, etc., can receive, based at least in part on the one or more streaming parameters, the streaming content. For example, streaming application 110 can generate requests for content having a requested size based on the one or more streaming parameters, a list of requests to different streaming server(s) 112, requests that overlap in time, etc., can store content parameters, logging information, and/or the like, as described. In addition, streaming application 110 can control the requests based on the buffer 130 capacity corresponding to one or more of the water levels 132, 134, 136, etc., and/or streaming application service 120 can modify the one or more streaming parameters based on the buffer 130 capacity corresponding to one or more of the water levels 132, 134, 136, as described. The device 100 can also render the streaming content at a rate specific to the content, and can drain the buffer 130 as content is rendered.

FIG. 3 is a flowchart of an example of a method 300 for modifying parameters for streaming content based on detecting a process executing on a device. For example, method 300 can be performed by a device 100 and/or one or more components thereof to facilitate streaming content.

In method 300, at action 202, one or more environmental parameters of a device can be determined. In an example, environment detecting component 122, e.g., in conjunction with processor 102, memory 104, operating system 106, streaming application service 120, etc., can determine the one or more environmental parameters of the device. As described, for example, environment detecting component 122 can determine the one or more environmental parameters relating to powering the device 100, relating to network communications by the device 100, relating to the streaming content, etc. As described herein, one or more of these parameters (or similar environmental parameters) can be used to modify streaming parameters to improve power consumption during content streaming operations.

In method 300, at action 304, a process can be detected executing on the device. In an example, process analyzing component 126, e.g., in conjunction with processor 102, memory 104, operating system 106, streaming application service 120, etc., can detect the process executing on the device. For example, the process can be detected as a specific detected process (e.g., detected based on a process name, identifier, etc.). In another example, the process can be detected as utilizing one or more resources of the device 100, an amount of the one or more resources being used (e.g., a SSD, network device of the device 100, etc.), and/or the like.

In modifying the one or more streaming parameters at action 306, optionally at action 308, execution of the process can be modified. In an example, process analyzing component 126, e.g., in conjunction with processor 102, memory 104, operating system 106, streaming application service 120, etc., can modify execution of the process. For example, process analyzing component 126 can modify the process by causing the process to decrease resource usage to allow for collecting reliable power consumption data for the streaming application 110. For example, process analyzing component 126 can cause the process to use non-persistent storage for storing parameters/logging information during a period of time of executing streaming application 110. In another example, process analyzing component 126 can modify the process operation parameters to reduce usage of resources (e.g., set logging parameters of the process to lower levels and/or the like) during a period of time of executing streaming application 110. In another example, process analyzing component 126 may pause or terminate execution of the application during a period of time of executing the streaming application 110. In one example, network logging applications on the device 100 may be modified in this regard.

In modifying the one or more streaming parameters at action 306, optionally at action 310, a streaming request time can be modified based on detecting the process. In an example, streaming adjusting component 124, e.g., in conjunction with processor 102, memory 104, operating system 106, streaming application service 120, etc., can modify the streaming request time based on process analyzing component 126 detecting the process. For example, streaming adjusting component 124 can cause streaming application 110 requests to be sent when the process is detected to be using a network device of the device 100 to leverage the network device as it is already being used. This can conserve power otherwise associated with powering the network device when streaming application 110 determines to make a request for streaming content. In addition, this may be further based on the buffer 130 capacity, as described above. For example, a water level can be set where streaming application service 120 can buffer requests for content until the process analyzing component 126 detects network device utilization by another process (e.g., and/or may set another water level at which to send the requests regardless of detecting such a process).

In method 300, at action 224, the streaming content can be received based at least in part on the one or more streaming parameters. In an example, streaming application 110, e.g., in conjunction with processor 102, memory 104, operating system 106, etc., can receive, based at least in part on the one or more streaming parameters, the streaming content. For example, streaming application 110 can generate requests for content based on modifying the streaming requests based on the detected process and/or modify the detected process based on activities of the streaming application 110.

Figure 4:
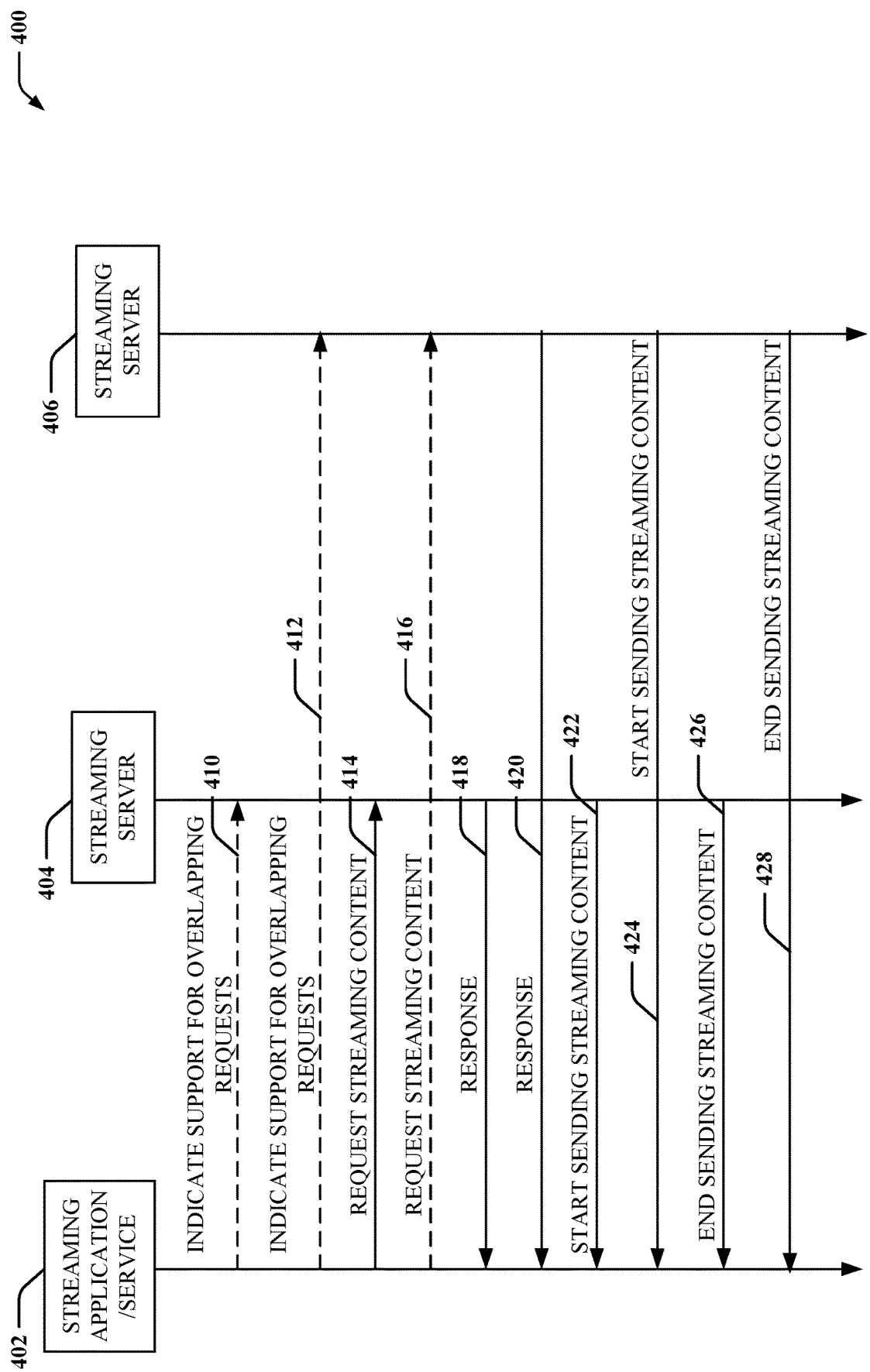
FIG. 4 is a schematic diagram of an example of a system that supports overlapping streaming content requests.

FIG. 4 illustrates an example of a system 400 for sending overlapping requests for streaming content. System 400 includes a streaming application/service 402 that can include a streaming application 110 and streaming application service 120, as described above, and multiple streaming servers 404, 406. In an example, streaming application/service 402 can optionally indicate support for overlapping requests to streaming server 404 at 410 and/or to streaming server 406 at 412. This can enable streaming server(s) 404, 406 to support the overlapping requests from the streaming application/service 402 (e.g., without shutting down the connection, etc.). The streaming application/service 402 can request streaming content from the streaming server 404 at 414, and the streaming server 404 can start sending streaming content at 416. The streaming application/service 402 can then send a request for streaming content (e.g., for a next segment) to streaming server 406 at 418 or 420 (e.g., before or after streaming content is sent from the streaming server 404) before a response 418 is received for request 414 and/or before streaming content from streaming server 404 ends at 424. In this regard, the requests for streaming content 414 and 416 can overlap in time such that the request 416 is sent and/or receiving of content for the request 416 is started before all streaming content from request 414 is received and/or before a response 418 to the request 414 is received.

Though shown as being sent after request 414, request 416 can additionally or alternatively be sent after response 418 to request 414 is received from streaming server 404 and/or after streaming server 404 starts sending streaming content at 422. In an example, request 416 can be sent based on receiving the response 418 and/or based on receiving the sent streaming content 422, or request 416 can be sent after request 414 and regardless of a status of request 414. In any case, responses 418 and 420 can be received for requests 414 and 416, respectively, and can indicate whether streaming content is to be sent from the streaming server 404 and 406, respectively. Where the responses 418 and 420 indicate that streaming data is to be sent, streaming server 404 and 406 can then send streaming content 422 and 424 to the streaming application/service 402. As described, streaming application/service 402 can perform overlapping requests based on detecting the one or more environmental parameters. The overlapping requests may reduce power consumption by decreasing dead time delays during data reads. In any case, streaming server 404 and 406 can end sending streaming content at 426 and 428.

Figure 5:
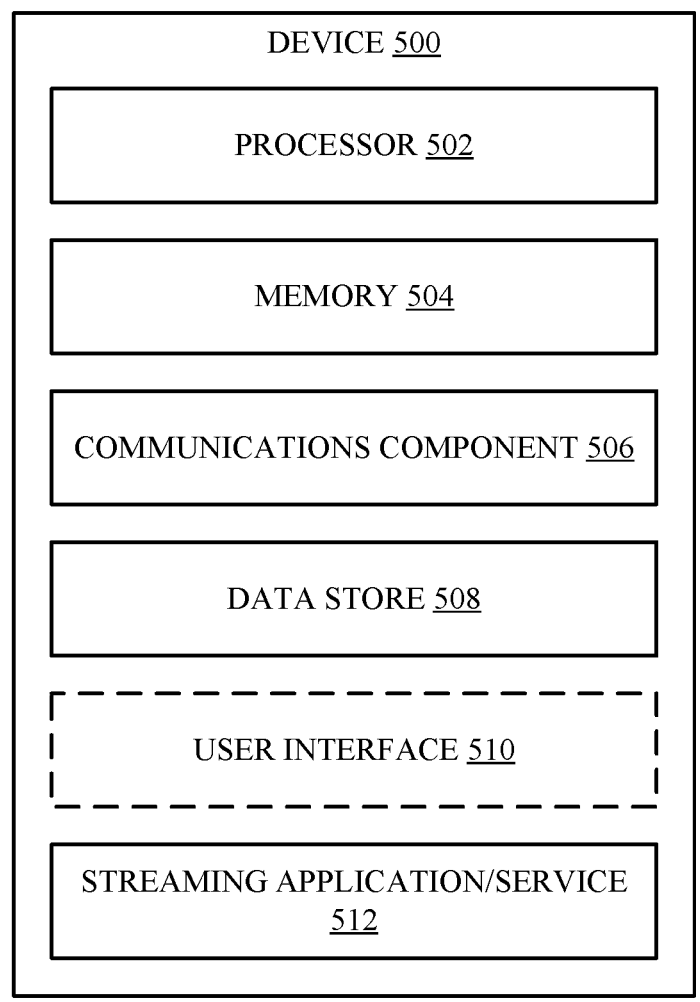
FIG. 5 is a schematic diagram of an example of a device for performing functions described herein.

FIG. 5 illustrates an example of device 500 including additional optional component details as those shown in FIGS. 1. In one aspect, device 500 may include processor 502, which may be similar to processor 102 for carrying out processing functions associated with one or more of components and functions described herein. Processor 502 can include a single or multiple set of processors or multi-core processors. Moreover, processor 502 can be implemented as an integrated processing system and/or a distributed processing system.

Device 500 may further include memory 504, which may be similar to memory 104 such as for storing local versions of operating systems (or components thereof) and/or applications being executed by processor 502, such as a streaming application/service 512, etc., related instructions, parameters, etc. Memory 504 can include a type of memory usable by a computer, such as random access memory (RAM), read only memory (ROM), tapes, magnetic discs, optical discs, volatile memory, non-volatile memory, and any combination thereof.

Further, device 500 may include a communications component 506 that provides for establishing and maintaining communications with one or more other devices, parties, entities, etc. utilizing hardware, software, and services as described herein. Communications component 506 may carry communications between components on device 500, as well as between device 500 and external devices, such as devices located across a communications network and/or devices serially or locally connected to device 500. For example, communications component 506 may include one or more buses, and may further include transmit chain components and receive chain components associated with a wireless or wired transmitter and receiver, respectively, operable for interfacing with external devices.

Additionally, device 500 may include a data store 508, which can be any suitable combination of hardware and/or software, that provides for mass storage of information, databases, and programs employed in connection with aspects described herein. For example, data store 508 may be or may include a data repository for operating systems (or components thereof), applications, related parameters, etc.) not currently being executed by processor 502. In addition, data store 508 may be a data repository for streaming application/service 512 and/or one or more other components of the device 500.

Device 500 may optionally include a user interface component 510 operable to receive inputs from a user of device 500 and further operable to generate outputs for presentation to the user. User interface component 510 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 510 may include one or more output devices, including but not limited to a display, a speaker, a haptic feedback mechanism, a printer, any other mechanism capable of presenting an output to a user, or any combination thereof. For example, user interface 510 may render streaming content for consumption by a user (e.g., on a display of the device 500, an audio output of the device 500, and/or the like).

Device 500 may additionally include a streaming application/service 512, which may be similar to or may include one or both of streaming application 110 and/or streaming application service 120. In this regard, device 500 may be operable to request and receive streaming content by determining streaming parameters based on environmental parameters of the device 500, as described herein.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A computer implemented method for streaming content to a device, comprising:
   determining whether a power source used to power the device is battery or alternating current (AC) power;
   determining an achievable network bandwidth by the device over one or more network connections to one or more streaming servers;
   determining an amount of buffered streaming content at the device;
   modifying, based at least in part on whether the power source is battery or AC power, the achievable network bandwidth, and the amount of buffered streaming content, one or more parameters for controlling an amount of streaming content to receive via the one or more streaming servers over the one or more network connections, wherein overlapping requests are enabled with the one or more streaming servers, and wherein modifying the one or more parameters for receiving the streaming content comprises modifying request times for sending at least a portion of multiple streaming content requests such that at least the portion of the multiple streaming content requests, and/or corresponding streaming content responses, overlap in time; and
   receiving, based at least in part on the one or more parameters, the streaming content.

2. The computer implemented method of claim 1, wherein modifying the one or more parameters for receiving the streaming content comprises modifying an amount of the streaming content requested in a single request for content sent to the one or more streaming servers for content of a size corresponding to a specific period of time.

3. The computer implemented method of claim 1, wherein modifying the one or more parameters for receiving the streaming content comprises modifying a list of multiple streaming content requests to request streaming content from multiple streaming servers for content of a size corresponding to a specific period of time.

4. The computer implemented method of claim 1, further comprising determining that overlapping requests are enabled by at least one of querying at least one of the one or more serving servers to determine whether overlapping requests are supported or notifying at least one of the one or more streaming servers of an ability to process responses to overlapping requests.

5. The computer implemented method of claim 1, wherein modifying the one or more parameters includes modifying a minimum amount of the buffered streaming content to store in a buffer before requesting, by the device, additional streaming content from the one or more streaming servers.

6. The computer implemented method of claim 1, wherein modifying the one or more parameters for receiving the streaming content comprises modifying a minimum amount of the buffered streaming content to store in a buffer before reducing a power state of one or more portions of the device.

7. The computer implemented method of claim 1, wherein modifying the one or more parameters for receiving the streaming content is further based at least in part on determining a process on the device other than receiving the streaming content.

8. The computer implemented method of claim 7, wherein modifying the one or more parameters for receiving the streaming content comprises modifying a time for requesting the streaming content to a time during which the process executes on the device.

9. The computer implemented method of claim 7, wherein modifying the one or more parameters for receiving the streaming content comprises modifying execution of the process.

10. The computer implemented method of claim 7, further comprising writing one or more content parameters or logging information stored in a non-persistent storage to a persistent storage based at least in part on determining the process.

11. The computer implemented method of claim 1, further comprising determining one or more user preferences specified for receiving the streaming content, wherein modifying the one or more parameters is further based at least in part on the one or more user preferences.

12. A device configured for streaming content, comprising:
a memory storing one or more parameters or instructions for executing a streaming application; and
at least one processor coupled with the memory, wherein the at least one processor is configured to:
determine whether a power source used to power the device is battery or alternating current (AC) power;
determine an achievable network bandwidth by the device over one or more network connections to one or more streaming servers;
determine an amount of buffered streaming content at the device;
modify, based at least in part on whether the power source is battery or AC power, the achievable network bandwidth, and the amount of buffered streaming content, one or more parameters for controlling, by the streaming application, an amount of streaming content to receive via the one or more streaming servers over the one or more network connections, wherein overlapping requests are enabled with the one or more streaming servers, and wherein the one or more parameters modified includes request times for sending at least a portion of multiple streaming content requests such that at least the portion of the multiple streaming content requests, and/or corresponding streaming content responses, overlap in time; and
receive, based at least in part on the one or more parameters, the streaming content.

13. The device of claim 12, wherein the at least one processor is configured to modify the one or more parameters for receiving the streaming content at least in part by modifying an amount of the streaming content requested in a single request for content sent to the one or more streaming servers for content of a size corresponding to a specific period of time.

14. The device of claim 12, wherein the at least one processor is configured to modify the one or more parameters for receiving the streaming content at least in part by modifying a list of multiple streaming content requests to request streaming content from multiple streaming servers for content of a size corresponding to a specific period of time.

15. The device of claim 12, wherein the at least one processor is configured to modify the one or more parameters for receiving the streaming content at least in part by modifying a minimum amount of the buffered streaming content to store in a buffer before reducing a power state of one or more portions of the device.

16. A non-transitory computer-readable medium, comprising code executable by one or more processors for streaming content to a device, the code comprising code for:
determining whether a power source used to power the device is battery or alternating current (AC) power;
determining an achievable network bandwidth by the device over one or more network connections to one or more streaming servers;
determining an amount of buffered streaming content at the device;
modifying, based at least in part on whether the power source is battery or AC power, the achievable network bandwidth, and the amount of buffered streaming content, one or more parameters for controlling an amount of streaming content to receive via the one or more streaming servers over the one or more network connections, wherein overlapping requests are enabled with the one or more streaming servers, and wherein modifying the one or more parameters for receiving the streaming content comprises modifying request times for sending at least a portion of multiple streaming content requests such that at least the portion of the multiple streaming content requests, and/or corresponding streaming content responses, overlap in time; and
receiving, based at least in part on the one or more parameters, the streaming content.

17. The non-transitory computer-readable medium of claim 16, wherein the code for modifying the one or more parameters for receiving the streaming content modifies an amount of the streaming content requested in a single request for content sent to the one or more streaming servers to obtain content of a size corresponding to a specific period of time.

18. The device of claim 12, wherein the at least one processor is configured to modify the one or more parameters at least in part by modifying a minimum amount of the buffered streaming content to store in a buffer before requesting, by the device, additional streaming content from the one or more streaming servers.

19. The device of claim 12, wherein the at least one processor is further configured to determine that overlapping requests are enabled by at least one of querying at least one of the one or more serving servers to determine whether overlapping requests are supported or notifying at least one of the one or more streaming servers of an ability to process responses to overlapping requests.

20. The non-transitory computer-readable medium of claim 16, wherein the code includes code for determining that overlapping requests are enabled by at least one of querying at least one of the one or more serving servers to determine whether overlapping requests are supported or notifying at least one of the one or more streaming servers of an ability to process responses to overlapping requests.

* * * * *